Patented Mar. 8, 1949

2,463,508

UNITED STATES PATENT OFFICE 2,463,508

CATALYST AND PROCESS FOR HYDROCARBON CONVERSION

John R. Bates, Swarthmore, Pa., assignor to Houdry Process Corporation, Wilmington, Del., a corporation of Delaware No Drawing. Application November 5, 1945, Serial No. 626,890

14 Claims. (Cl. 196—52)

The present invention relates to catalysts for use in hydrocarbon conversion reactions, methods of preparation of such catalysts and to processes involving the conversion of hydrocarbons employing these contact bodies.

As is well recognized in the industry, development of catalytic processes proceeds almost exclusively upon empirical lines. Many differences are observed in results during use, when catalysts of similar analytical composition but prepared by differing procedures are employed. This is particularly true in such complicated reactions as in the cracking of higher boiling hydrocarbons for the production of gasoline and in other similar reactions wherein both the charge and product are mixtures of compounds of diverse type, and the compounds of a particular type in the mixture vary considerably in molecular weight. In addition to the complexity of the materials treated in cracking and reforming processes, many reactions are occurring simultaneously. Some of these reactions result in the production of desired products, while some other reactions occurring produce losses to gas and coke and are, accordingly, considered side reactions.

By the use of catalysts it is possible to control in some measure the relative rates of the reactions which occur. Some catalysts are in fact detrimental since they promote the undesirable reactions. Thus, it has been found that catalysts of the same degree of activity, measured in terms of gasoline produced under specified test conditions, may and often do differ considerably in their directive properties.

In the manufacture of a gasoline, an important consideration is the factor of octane barrels of product per barrel of charging stock to the plant where octane barrels is a measure of the blending value of the product and is computed as octane number times number of barrels. If the octane of the gasoline produced is sufficient to allow blending of low octane gasoline and still satisfy the octane requirement of gasoline of the type desired, an increase in octane barrels will increase the amount of low octane stock which may be blended into the catalytically cracked gasoline, thereby reducing the cost per gallon of product and generally increasing the output of the refinery which normally has an excess of straight run low octane gasoline.

Other features of the directive action of the cracking catalyst are also of considerable importance. The relationship of gasoline to other products should be considered in the evaluation of the utility of a catalyst. Thus the liquid recovery (the percentage of the cracked products condensable at normal operating temperatures, usually about 60° F., based on the original charge stock) indicates the amount of such saleable products as gasoline and fuel oil. A high gasoline to uncondensed gas ratio is desirable, inasmuch as a considerable portion of the uncondensed gas has a low commercial value and is usable generally only as a cheap fuel for the refinery. A high gasoline to coke ratio (coke is the carbonaceous deposit which accumulates on the catalyst during the course of cracking) is desirable since the coke represents a loss of charge stock and limits the cracking operation because of the relationship of the amount of coke to the regeneration phase of the cracking process.

In accordance with the present invention, directive catalysts for hydrocarbon reactions are produced which contain oxides of silicon, aluminum and manganese. In the catalysts of the invention the silicon and aluminum oxides are produced by precipitation of hydrous oxides thereof, and the oxide of manganese, precipitated from a solution of a soluble salt containing manganese, is composited in moist, undried state with said silicon and aluminum compounds while they are also in moist, undried state. Hydrocarbons such as gas oils are contacted with the resulting contact masses under conversion conditions, with substantial improvement in the blending value of gasoline produced. For purposes of simplicity the manganese compound precipitated is referred to as a manganese oxide, though it should be understood that this term is employed in a broad sense, since the material actually precipitated is probably a hydrous oxide.

It has been found that the advantages accruing by virtue of the present invention may be obtained with catalysts prepared by diverse specific procedures of the type above described. Thus, the manganese oxide may be co-precipitated with hydrous oxides of both silica and alumina, for example, by introducing solutions of the three into a gel-spraying nozzle. Alternatively, any two may be co-precipitated, and the co-precipitate in moist, undried state or condition may be composited with the third either by precipitating the third from solution on a suspension of the co-precipitate or by blending the co-precipitate with a moist, undried precipitate of the other. Again, all three may be separately precipitated and the three composited in moist, undried state by either of these described procedures. Throughout this application, and in the subjoined claims, by reference to precipitates "in moist, undried state or condition," it is intended to describe precipitates in their physical state prior to any drying operation, though where the precipitate does not set up as a gel embracing all the liquid of the reactant solutions, it may be dewatered by filtration, decantation or the like. Within the scope of the term, "salt containing manganese," as employed in this description and in the subjoined claims, it is intended to include such salts regardless of whether the manganese is present in the cation, for example, manganous chloride; or in the anion, for example, potassium manganate and potassium permanganate.

It is preferred that the catalysts of the present invention be substantially free of alkali metal compounds. This may be effected by base-exchanging the gel either before or after drying with an ammonium salt solution, whereby ammonium ion is substituted in the composite for the alkali metal. Upon calcination of the composite, ammonia is expelled. For this purpose organic bases such as the amines are the full equivalent of ammonia.

Within the scope of the present invention the co- or separately precipitated gels may be in the physical form at times referred to as "true gel" or "jelly," in which substantially all the reactant solution is embraced within the gel strucure; or they may be in the form of a gelatinous precipitate; or in the form of mixtures of true gels and gelatinous precipitates.

The catalysts employed in the process of the present invention contain a major proportion of silica and a minor proportion of alumina and manganese oxide. I have discovered that catalysts containing over 1% to about 15% of manganese oxide (determined as MnO) and from about 3 to 25% of alumina, the remainder being of silica and prepared according to my invention possess valuable directive properties with respect to octane barrels produced, liquid recovery, and high gasoline to coke and gasoline to gas ratios. Especially valuable catalysts are those containing at least 2% and preferably between 2 to 5% MnO. The valence of the manganese in the soluble salt from which the catalyst is derived does not appear to affect the results obtained using these catalysts. It should be noted that the results obtained with catalysts of the type here involved are distinct from the results obtained with catalysts in which the manganese is otherwise deposited as, for instance, the type in which manganese dioxide is mixed with an active clay or a dried synthetic silica-alumina blend.

The composite prepared by any of the procedures above indicated is, in accord with a preferred form of the present invention, shaped into discrete pieces of suitable size by molding, extrusion, crushing or the like. The shaped pieces are then heat-treated at a temperature of the order of 1,000 to 1,600° F., which heat treatment develops in the catalysts strength and adequate resistance to abrasion. For the production of high strength characteristics in the catalyst, the moist gel containing silica and alumina is preferably subjected prior to drying to an aging operation which can be speeded up by the application of heat.

The contact masses of my invention differ from, and are not to be confused with, contact masses containing manganese oxides which catalysts have been prepared in a manner known to the art. The inclusion of the proper amount of manganese oxide in contact masses comprising silica and alumina, as by impregnating silicious masses with decomposable salts to produce a contact mass containing amounts less than 1% and particularly less than 0.5% of manganese oxide, results in a promoter action which enhances the catalytic activity of such contact masses. However, when silicious masses are similarly produced which contain amounts greater than 1% of manganese oxide, the action of the manganese oxide is harmful and such a catalyst has less activity than a catalyst from which the manganese oxide has been omitted (see Example 5). Such behavior is not abnormal and is found in other cases of promoter action (see, for example, "The Mechanism of Catalysis" by R. H. Griffith, Oxford University Press, 1936, page 65, Figure 42, curve F). I have found that contact masses containing the oxides of silicon and aluminum and amounts of manganese oxide greater than 1% can be prepared according to my invention and that such catalysts, in contradistinction to catalysts of similar compositions produced by other methods, have approximately equal or superior activity and are more directive in their cracking characteristics than catalysts identically produced but lacking the manganese oxide.

Hydrocarbon materials within the scope of this invention are contacted with the contact masses of my invention under conversion conditions. In the production of gasoline, the hydrocarbon charging stock preferably is a gas oil or heavier stock substantially free of heavy residuum. Thus, stocks which may be used in this process may have a 50% Engler point of 300° F., or above and may be substantially free of materials boiling above 1,100° F. (the boiling points being those at atmospheric pressure). Conversion conditions vary considerably with the specific charging stock employed, though in general suitable conditions for most stocks may be found within the ranges; temperature, between 700° and 950° F.; rate, from 10/20 (10 volumes hydrocarbon liquid basis, per 20 volumes catalyst, per hour) to about 150/20, and pressures from about slightly below atmospheric upward to around 200 pounds or so. It is within the scope of my invention to pass high acid heat-gasolines over the contact masses of my invention under cracking conditions to produce a stable high octane gasoline, or to treat a straight run naphtha to produce a high octane motor fuel. Processes of this type are characterized by low gas and coke, high liquid recovery, high percent production of high octane gasoline and high octane barrel factor per barrel of charge, as will be apparent from the following examples.

*Example I*

A contact mass was prepared to contain silica, alumina and an oxide of manganese, in the molar proportions 11.8:1.0:0.463. In order to prepare this contact mass, three solutions were prepared, one containing 107.8 kg. of "N-brand" sodium silicate ($SiO_2:Na_2O::3.22:1$ and sp. gr. 1.396.) in 45.2 kg. of water; 7.91 kg. of sodium aluminate in 169.1 kg. of water; and 24.9 kg. ammonium sulphate and 6.91 kg. manganous nitrate in 82.4 kg. of water. These three solutions were mixed in a mixing head, of the type described in U. S. Patent No. 2,232,727 granted to Albert G. Peterkin and Hubert A. Shabaker on February 25, 1941, and at the rate of 7.5 liters per minute. The temperature upon formation of the gel was 22° C. and the pH was 10.2, which after 20 minutes decreased to 9.6. The gel so formed was dried at a temperature of 200 to 210° F. The dried gel was washed ten times with water on a vacuum filter. It was then treated four times with a solution of ammonium chloride to remove base-exchangeable alkali metal and washed five times with water. The washed gel was then dried in gas-fired ovens at 160 to 180° F. for 10 hours, following which it was ground for 3 hours in a ball mill. The powder was made into a paste with water and formed in cylindrical pellets 4 mm. long and 4 mm. in diameter. The contact mass was analyzed and found to contain 2.24 weight percent of manganese oxide, based on the mass ignited at about 1400° F. The pellets so formed were dried and then heat treated for 10 hours at 1400° F. in a mixture of 5% steam and 95% air. This contact mass had an apparent density of 0.543 kg. per liter.

(a) The catalyst so produced was employed for the conversion of a light gas oil having an Engler boiling range of 440° to 724° F., and a 50% point of 534° F. During conversion the catalyst was maintained at 790° F. and the charge was fed at a rate of 30/20, at atmospheric pressure, with no added steam. The normally liquid components in the effluent from the conversion reaction were condensed and occupied a volume of 98.7% of the volume of charge. The motor gasoline contained in the condensed material was separated by distillation, and, by volume, constituted 43.1% of the volume charged. In the cracking of the light gas oil, there was formed 2.3 weight per cent of coke and 4.6 weight per cent of gas, both based on the weight of the original charge. A contact mass, similarly prepared and treated and containing the same ratio of silica to alumina but omitting the manganese oxide, was tested under the same conditions. The contact mass without the manganese oxide cracked the light gas oil to 43.3 volume per cent of gasoline, 3.6 weight per cent of coke and 7.8 weight per cent of gas with a liquid recovery of 93.8% based on the original charge. The inclusion of the manganese oxide therefore produced an improvement of 56% in the gasoline to coke ratio, 70% in the gasoline to gas ratio, and 5.2% in the liquid recovery.

(b) The contact mass containing the manganese oxide was also employed for the conversion of a gas oil having an Engler distillation range of 440° to 712° F. and a 50% point of 578° F. This stock was contacted with the catalyst in a converter surrounded with a molten salt mixture at a temperature of 800° F., at a rate of 32/20, and at a pressure of 15 lbs. per sq. in. with no added steam. A total liquid recovery of 94.6% was obtained and a gasoline recovery of 57.2%, (both by volume based on charge), which gasoline had an octane value of 79.0. In a cracking run made under identical conditions, the catalyst from which the manganese oxide had been omitted produced 43.6 octane barrels per barrel of charge which is inferior to the cracking run described above in which the catalyst containing the manganese oxide produced 45.2 octane barrels per barrel of charge. Furthermore, the catalyst containing the manganese oxide formed 9% less coke.

(c) This catalyst was also employed to crack the same charging stock at a rate of 50/20 instead of 32/20, all other conditions being the same. A liquid recovery of 99% by volume was obtained and a gasoline recovery of 49.7%, which gasoline had an octane value of 78. By this procedure 38.7 octane barrels of gasoline per barrel of charge were obtained as against 36 octane barrels per barrel of charge for the same catalyst with the exception of the omission of manganese. Furthermore, the contact mass containing the manganese oxide formed 38 weight per cent less gas than the contact mass without the manganese oxide, while maintaining the same gasoline to coke ratio.

(d) Another process was carried out with the same charging stock and same contact mass at the conditions of 750° F., 30/20 charging rate, 18 lbs. per sq. in. pressure with no added steam. A liquid recovery of 98.7% was obtained, together with 55.5 volume per cent of gasoline with an octane number of 77.0. In order to compare the catalyst from which the manganese oxide had been omitted a run was made at 32/20, 750° F., 15 lbs. per sq. in. pressure with no added steam. A liquid recovery of only 96.5% was obtained and 52.9 volume per cent of gasoline of 76.9 octane number was produced. Furthermore, the catalyst containing the manganese oxide produced 52 weight per cent less gas.

*Example II*

Three solutions were prepared: first, an aqueous solution of "N-brand" silicate diluted to a specific gravity of 1.2505; a second of sodium aluminate of specific gravity of 1.0435; and a third of ammonium sulphate and manganous sulphate in weight ratio of 13.95 to 3.74, this third solution having a specific gravity of 1.2010. These solutions contained silica and alumina in the weight ratio of 14.3 to 1. These three solutions were fed into a mixing head of the type above alluded to at rates of 588, 480 and 470, respectively, cc. per 15 seconds. The gel was dried for 90 minutes with circulation of air to produce rapid drying, washed free of soluble material, base-exchanged, washed, pelleted and heat-treated, as described in connection with Example I. The contact mass had an apparent density of 0.6, and contained 2.85% manganese oxide by analysis.

A gas oil of boiling range 440° to 724° F. and 50% point of 534° F. was contacted with the catalyst so produced at a rate of 30/20, a temperature of 790° F. at atmospheric pressure, and with no added steam. A total liquid recovery of 98% by volume was obtained, and a recovery of 48.2% of high octane gasoline was obtained by fractionation therefrom. A catalyst, containing the same ratio of silica and alumina and prepared and processed in the same manner as described above, was tested under the same conditions. It produced only 46.1% of high octane gasoline and, moreover, the gasoline to coke ratio was 12.5 and the gasoline to gas ratio was 6.3 whereas the values for these ratios for the comparable catalyst containing the manganese oxide were 15.5 and 11.7 respectively.

By modifying the heat treatment of another sample of this catalyst by maintaining it at 1050° F. for two hours in air instead of at 1400° F. for ten hours in 5% steam, the same gas oil under identical conditions gave a yield of 51.4% gasoline by volume based on charge.

*Example III*

A contact mass was prepared by coprecipitating the hydrous oxides of silicon, aluminum and manganese using the mixing head and method described in Example I, the solutions containing reagents to produce a molar ratio of silica to alumina of 11.8 to 1. The gel was formed at room temperature and had a pH of 9.5 after formation. The gel was dried, washed and base exchanged with ammonium chloride to remove alkali metal, again washed, dried, ground and formed into pellets. These pellets were heat treated for 10 hours at 1400° F., using a stream of gas composed of 5% steam and 95% air. The contact mass had an apparent density of 0.550 kilograms per liter.

The catalyst was analyzed and contained 1.31 weight per cent MnO based on the mass ignited at about 1400° F. The heat treated pellets were tested using the charge stock and conversion conditions described in Example I (a). The cracking operation yielded 41.2 volume per cent of gasoline, 2.7 weight per cent of coke and 3.9 weight per cent of gas.

Example IV

A contact mass was prepared mixing solutions of (1) sodium silicate; (2) sodium aluminate and (3) ammonium sulfate and a salt of manganese. When solutions (1), (2) and (3) were commingled, a precipitate or gel formed containing the hydrous oxides of silicon, aluminum and manganese. The temperature of the gel was raised to 210° by steam. The steam treatment was continued for 15 minutes and the gel then dried with rapid circulation of air for 90 minutes. The dried gel was washed, base exchanged with amonium chloride to remove adsorbed alkali metal ions, again washed, dried, ground and formed into pellets. The contact mass, by analysis, contained 4.7 weight per cent of MnO based on the ignited weight of the mass. The pellets were heat treated at 1400° F. for 10 hours with a stream of gas composed of 5% steam and 95% air. The heat treated pellets were tested for hardness by means of a knife edge which was placed on the pellet and loaded with a variable weight. The pellets produced using steam treatment of the wet gel bore 7½ times more weight before breaking than did a comparable catalyst which had not been steam treated as a wet gel.

A catalyst having the same ratio of silica to alumina but containing no manganese oxide was prepared by the procedure described in the paragraph above (including the steam treatment of the wet gel). Both catalysts were tested using the charge stock and procedure described in Example I (a). The catalyst containing the manganese oxide yielded 45.5 volume per cent of gasoline, 2.6 weight per cent of coke and 2.6 weight per cent of gas with a liquid recovery of 97.0% while the comparable catalyst from which the manganese oxide had been omitted yielded 41.1 volume per cent of gasoline, 3.3 weight per cent of coke and 6.7 weight per cent of gas with a liquid recovery of 94.9%. Thus the catalyst containing the manganese oxide was more selective and active for the cracking of hydrocarbon material to gasoline.

Example V

Three samples of a purified silica hydrogel were prepared and impregnated with solutions of decomposable salts so that the finished masses would contain (a) 12.5 weight per cent of alumina (b) 12.5 weight per cent of alumina and 1.0 weight per cent of manganese oxide (MnO) and (c) 12.5 weight per cent of alumina and 5.0 weight per cent of MnO. The three catalysts were prepared by taking chunks of silica hydrogel, which had been washed until the wash liquor was free of anions, immersing the hydrogel at room temperature in solutions containing appropriate amounts of aluminum and manganous nitrates, allowing the solutions and hydrogel to steep for 72 hours, decanting the supernatant liquors and drying the masses so prepared under identical conditions. The dried gels were then given identical heat treatments and tested as described in Example I (a). The results of the tests are given in the table below, where percentages of the products listed are based on the charge stock.

| Experiment | Weight Per Cent MnO in mass | Gasoline, Volume Per Cent | Coke, Weight Per Cent | Gas, Weight Per Cent |
|---|---|---|---|---|
| (a) | 0 | 48.2 | 4.4 | 13.9 |
| (b) | 1.5 | 43.2 | 2.5 | 7.6 |
| (c) | 5.0 | 40.1 | 2.6 | 7.4 |

This application is a continuation-in-part of my earlier filed application, Serial No. 405,160 filed August 2, 1941, now abandoned.

I claim as my invention:

1. In the catalytic conversion of hydrocarbons, the improvement which comprises contacting said hydrocarbons under conversion conditions with a contact mass prepared from a composite of moist undried hydrous oxides of silicon, aluminum and manganese, said contact mass containing a major portion of silica, a minor portion of alumina, and more than 1 and less than 15 weight percent of manganese oxide.

2. In the catalytic conversion of hydrocarbons, the improvement which comprises contacting said hydrocarbons under cracking conditions with a contact mass prepared from a composite of moist undried hydrous oxides of silicon, aluminum and manganese, said contact mass containing a major portion of silica, a minor portion of alumina, and more than 1 and less than 15 weight percent of manganese oxide.

3. In the catalytic conversion of hydrocarbons, the improvement which comprises contacting said hydrocarbons under cracking conditions with a contact mass prepared from a coprecipitated composite of the hydrous oxides of silicon, aluminum and manganese, said contact mass containing a major portion of silica, a minor portion of alumina and more than 1 and less than 15 weight percent of manganese oxide.

4. In the catalytic conversion of hydrocarbons boiling higher than gasoline to produce gasoline, the improvement which comprises contacting said hydrocarbons under cracking conditions with a calcined, substantially alkali metal free contact mass prepared from a coprecipitated composite of the hydrous oxides of silicon, aluminum and manganese, said contact mass containing a major portion of silica, from 3 to 25 weight percent of alumina and from 2 to 5 weight percent of manganese oxide.

5. In the catalytic conversion of a hydrocarbon mixture having a 50% boiling point above 300° F. to produce gasoline, the improvement which comprises contacting said hydrocarbon mixture with a contact mass under cracking conditions including temperatures in the range of 700° F. to 950° F., pressures in the range of slightly below atmospheric to about 200 pounds per square inch, and feed rates in the range of 10 to 150 volumes of hydrocarbon mixture per 20 volumes of contact mass per hour, said contact mass having been prepared from a coprecipitated composite of the hydrous oxides of silicon, aluminum, and manganese, said composite consisting essentially of a major portion of silica, a minor portion of alumina and from 2 to 5 weight percent of manganese oxide.

6. The method of preparing siliceous contact masses containing a minor portion of alumina and more than 1 and less than 15 weight percent of manganese oxide, which method comprises preparing a composite of the moist undried hydrous oxides of silicon, aluminum and manganese, drying the composite, and calcining the dried composite so as to produce an abrasion resistant contact mass having catalytic activity for the conversion of hydrocarbons.

7. The method of preparing siliceous contact masses containing a minor portion of alumina and more than 1 and less than 15 weight percent of manganese oxide, which method comprises coprecipitating a composite of the moist undried hydrous oxides of silicon, aluminum and manganese, drying the composite, and calcining the dried composite so as to produce an abrasion resistant contact mass having catalytic activity for the conversion of hydrocarbons.

8. The method of preparing siliceous contact masses containing a minor portion of alumina and more than 1 and less than 15 weight percent of manganese oxide, which method comprises coprecipitating a composite of the hydrous oxides of silicon, aluminum and manganese from a menstruum containing an alkali metal silicate, a soluble compound containing aluminum and a soluble compound containing manganese, removing at least a portion of the alkali metal ions from said composite by base-exchange, and calcining the base exchanged composite so as to produce an abrasion resistant contact mass having catalytic activity for the conversion of hydrocarbons.

9. The method of preparing siliceous contact masses containing between 3 to 25 weight percent of alumina and between 2 to 5 weight percent of manganese oxide, which method comprises coprecipitating a composite of the hydrous oxides of silicon, aluminum and manganese from a menstruum containing an alkali metal silicate, a soluble compound containing aluminum and a soluble compound containing manganese, drying said composite, removing at least a portion of the alkali metal ions from said composite by base-exchange, and calcining the base exchanged composite so as to produce an abrasion resistant contact mass having catalytic activity for the conversion of hydrocarbons.

10. A contact mass containing a major portion of silica, a minor portion of alumina and more than 1 and less than 15 weight percent of manganese oxide, said contact mass having been prepared from a composite of the moist undried hydrous oxides of silicon, aluminum and manganese, said contact mass being abrasion resistant and having catalytic activity for the conversion of hydrocarbons.

11. A contact mass containing a major portion of silica, a minor portion of alumina and more than 1 and less than 15 weight percent of manganese oxide, said contact mass having been prepared from a coprecipitated composite of moist undried hydrous oxides of silicon, aluminum and manganese, said contact mass being abrasion resistant and having catalytic activity for the conversion of hydrocarbons.

12. A contact mass containing a major portion of silica, a minor portion of alumina and between 2 to 5 weight percent of manganese oxide, said contact mass having been prepared from a coprecipitated composite of the moist undried hydrous oxides of silicon, aluminum and manganese, said contact mass being abrasion resistant and having catalytic activity for the conversion of hydrocarbons.

13. A calcined substantially alkali metal free contact mass containing a major portion of silica, between 3 to 25 weight percent of alumina and between 2 to 5 weight percent of manganese oxide, said contact mass having been prepared from a coprecipitated composite of hydrous oxides of silicon, aluminum and manganese and having catalytic activity for the conversion of hydrocarbons.

14. The contact mass of claim 13 additionally characterized in that at least 40 volume percent of gasoline based on the gas oil charged is produced when a gas oil having an approximate boiling range of 400° F. to 750° F. contacts said contact mass under cracking conditions which include a temperature of about 800° F., atmospheric pressure, and a rate of 30 volumes of liquid gas oil per 20 volumes of catalyst per hour.

JOHN R. BATES.

REFERENCES CITED

The following references are of record in the file of this patent:

UNITED STATES PATENTS

| Number | Name | Date |
|---|---|---|
| 2,166,266 | Schmidt | July 18, 1939 |
| 2,187,741 | Houdry | Jan. 23, 1940 |
| 2,242,553 | Thomas et al. | May 20, 1941 |
| 2,268,110 | Connolly | Dec. 30, 1941 |